United States Patent [19]

Yamada

[11] Patent Number: 4,930,062
[45] Date of Patent: May 29, 1990

[54] COMPUTER POWER SUPPLY WITH OPTICALLY ISOLATED SHUTDOWN CIRCUITS

[75] Inventor: Masanori Yamada, Tokyo, Japan

[73] Assignee: NEC Corporation, Tokyo, Japan

[21] Appl. No.: 407,086

[22] Filed: Sep. 14, 1989

[30] Foreign Application Priority Data

Sep. 14, 1988 [JP] Japan ................................. 63-232029

[51] Int. Cl.$^5$ ............................................. H02H 7/10
[52] U.S. Cl. ....................................... 363/55; 361/18;
307/125; 323/325; 323/349
[58] Field of Search ....................... 363/50, 52, 53, 55,
363/56, 67, 69, 89; 323/325, 349; 361/18;
307/29, 38, 125, 126, 130, 131

[56] References Cited

U.S. PATENT DOCUMENTS 4,709,320 11/1987 Konopka .............................. 363/56
4,847,720 7/1989 Dezonno ............................... 361/18

Primary Examiner—Patrick R. Salce
Assistant Examiner—Emanuel Todd Voeltz
Attorney, Agent, or Firm—Sughrue, Mion, Zinn, Macpeak & Seas

[57] ABSTRACT

A computer D.C. power supply comprises an AC-DC converter for converting alternating-current power from an external A.C. power source to direct-current power. A rectifier is connected to the A.C. power source to supply a D.C. voltage to a first light-emitting diode to cause it to emit light to a phototransistor, which is connected in the AC-DC converter for activating it in response to that light. A photo-thyristor is also connected to the rectifier and is optically coupled with a second light-emitting diode for establishing a low-impedance path across the first light-emitting diode in response to light from the second light-emitting diode. A switching circuit, connected to the output terminals of the AC-DC converter, is responsive to a shutdown command signal applied from a computer for activating the second light-emitting diode to cause light to be emitted therefrom to the photo-thyristor. A latching circuit is connected between the rectifier circuit and a gate electrode of the photo-thyristor to keep it conducting until the alternating-current power is turned off.

3 Claims, 2 Drawing Sheets

COMPUTER POWER SUPPLY WITH OPTICALLY ISOLATED SHUTDOWN CIRCUITS

BACKGROUND OF THE INVENTION

The present invention relates generally to D.C. power supplies and more specifically to a computer power supply having a safety power turnoff function.

As shown in FIG. 1, a known computer D.C. power supply comprises a main AC-DC converter 1 connected to a mains A.C. voltage source to feed D.C. power voltage to the various parts of the computer including CPU 4. AC-DC converter 1 is made up of a transformer, a rectifier connected thereto and a voltage stabilizing circuit to keep the output DC voltage at constant level. To avoid possible damage on a hard disk, the timing of shutdown of the computer is determined by the CPU 4. When the CPU makes this determination, it issues a command signal to a control 3 to allow it turn off the AC-DC converter 1. Since the control circuit 3 needs to be isolated from the AC voltage source in order to process the command signal, an auxiliary AC-DC converter 2 identical to AC-DC converter 1 is connected to the AC voltage source to supply power to the control circuit 3. However, the use of an additional AC-DC converter for powering the control circuit is not desirable from the view points of size and cost performance.

SUMMARY OF THE INVENTION

It is therefore an object of the present invention to provide a simplified DC power supply with a safety power turn-off circuit which is simple and cost effective.

The direct-current power supply of the present invention comprises an AC-DC converter for converting alternating-current power from an external AC power source to direct-current power. A rectifier circuit is provided for converting alternating-current power from the external source to direct-current voltage. A first light-emitting diode is connected to the rectified circuit to provide emission of light in response to the direct-current voltage therefrom and a phototransistor is optically coupled with the first light-emitting diode, the phototransistor being connected in the AC-DC converter for activating it in response to the light from the first light-emitting diode. A photo-thyristor is connected to the rectifier circuit and is optically coupled with a second light-emitting diode for establishing a low-impedance path across the first light-emitting diode in response to light from the second light-emitting diode. A switching circuit, connected to the output terminals of the AC-DC converter, is responsive to a shutdown command signal applied from a computer for activating the second light-emitting diode to cause light to be emitted therefrom to the photo-thyristor. A latching circuit is connected between the rectifier circuit and a gate electrode of the photo-thyristor to keep it conducting unit the alternating-current power is turned off.

In operation, when A.C. power is supplied from the external source, the first light-emitting diode is activated by the direct-current voltage from the rectifier circuit, causing the phototransistor to activate the AC-DC converter. During normal operation, the second light-emitting diode is kept in an inactive state. In response to a shutdown command signal, the switching circuit applies the output voltage of the AC-DC converter to the second light-emitting diode, and so the photo-thyristor conducts, establishing a low-impedance path across the first light-emitting diode to turn off the phototransistor, shutting down the AC-DC converter. The photo-thyristor is kept conducting by the latching circuit until the AC power is removed.

By the use of the second light-emitting diode and the photo-thysistor, the input circuit of the shutdown command signal is completely isolated from the primary circuit of the AC-DC converter. In addition, by the use of the first light emitting diode and the photo-thyristor, costly AC-DC converter is not required and a low-cost rectifier circuit can be used instead.

BRIEF DESCRIPTION OF THE DRAWINGS

The present invention will be described in further detail with reference to the accompanying drawings, in which.

DETAILED DESCRIPTION

Figure 1:
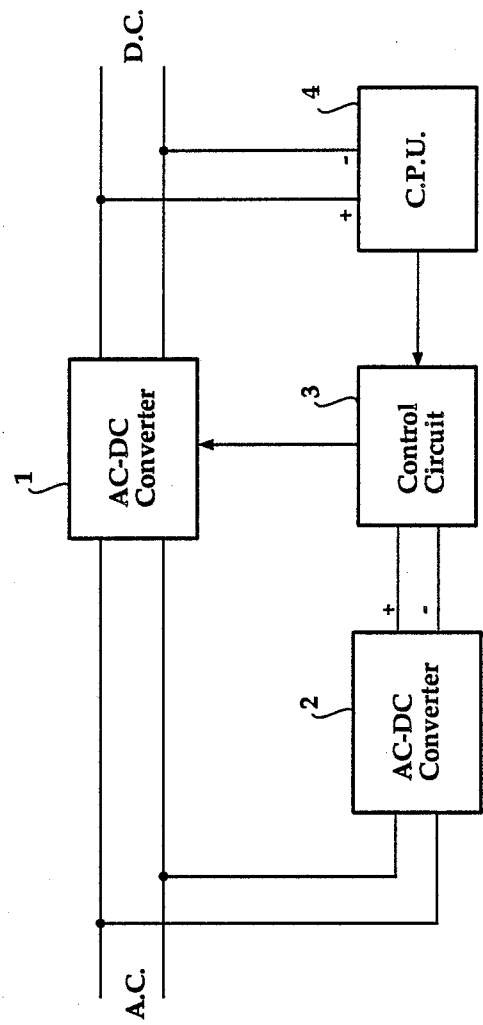
FIG. 1 is a schematic block diagram of a prior art DC power supply.
Figure 2:
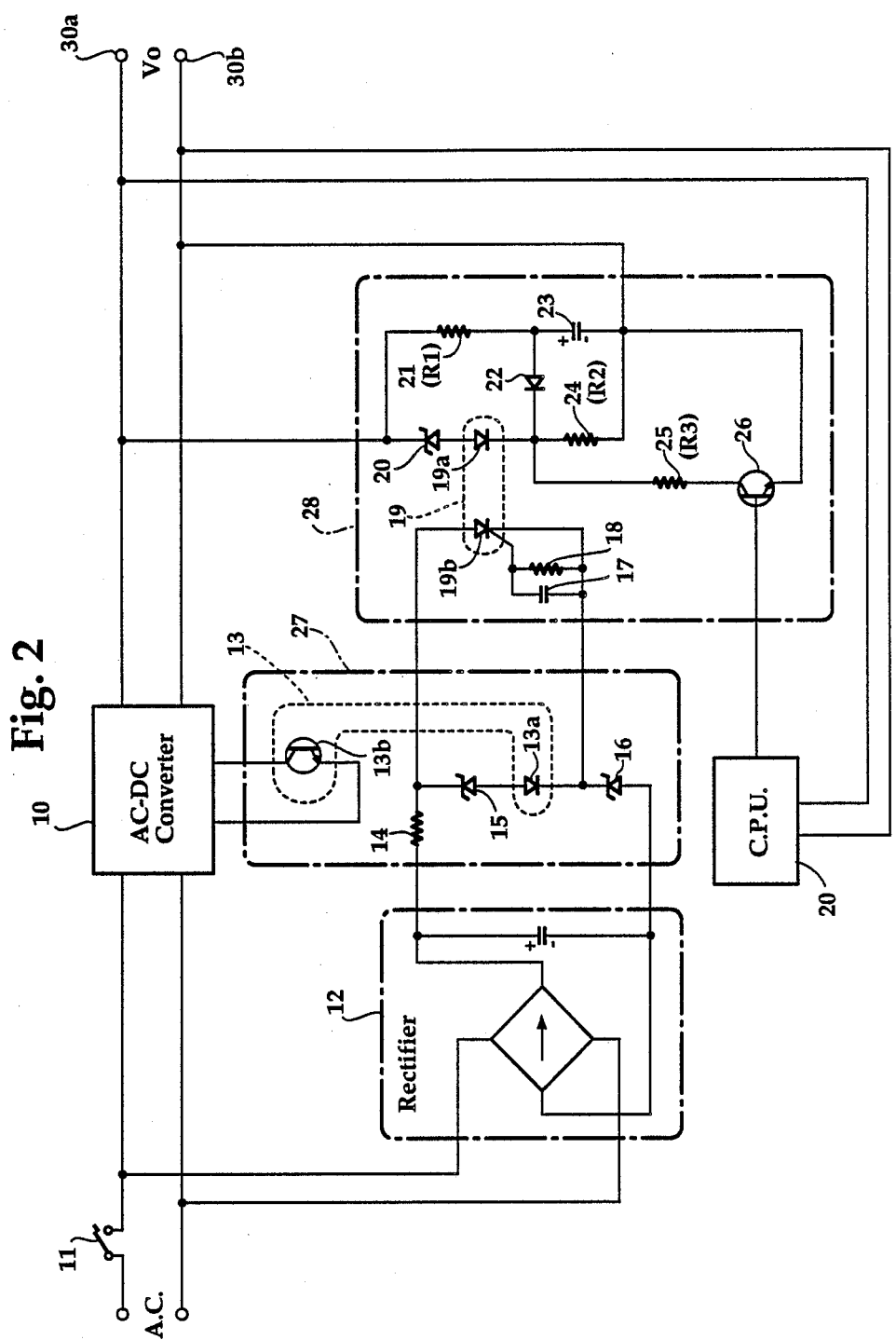
FIG. 2 is a circuit diagram of a DC power supply according to the present invention.

Referring to FIG. 2, a computer DC power supply according to an embodiment of the invention comprises an AC-DC converter 10 connected to a mains AC power voltage source through a power switch 11 to supply a controlled DC voltage across positive and negative DC output terminals 30a, 30b which lead to the various components of the computer as well as to the CPU 30. The DC power supply includes a photocoupler circuit 27 and a photo-thyristor circuit 28. Photocoupler circuit 27 is powered by the DC output of a rectifier circuit 12 which is connected to the AC power source through switch 11, while photo-thyristor circuit 28 is powered by the DC output of AC-DC converter 10.

Photocoupler circuit 27 comprises a photocoupler 13 formed by a light-emitting diode 13a and a phototransistor 13b which is disposed in a power control circuit of the AC-DC converter 10. The light-emitting diode 13a has an anode connected in series with a Zener diode 15 and a resistor 14 to the positive output terminal of the rectifier 12 and a cathode connected through a Zener diode 16 to the negative output terminal of the rectifier 12.

Photo-thyristor circuit 28 includes a photo-thyristor 19 formed by a light-emitting diode 19a and a photo-thyristor 19b. The anode of lightemitting diode 19a is coupled in series with a Zener diode 20 to the positive output terminal 30a, the cathode of the LED 19a being coupled to a junction of resistors 24 and 25 which are connected in series between the collector and emitter of a switching transistor 26, with the emitter of transistor 26 being connected to the negative output terminal 30b. Transistor 26 has its base coupled to an output terminal of the CPU 30 to respond to a shutdown command signal by coupling the resistor 25 to the negative output terminal 30b for reducing the potential at the cathode of LED 19a.

A series connection of a resistor 21 and a capacitor 23 is a filtering circuit which is connected between the positive and negative output terminals 30a and 30b to supply an appropriate operating voltage to transistor 26 to turn it on immediately following the turn-on of the DC power supply and to absorb transitory voltage fluctuations which follow the turn-on of transistor 26. The ensures against possible instability of the operation of transistor 26 during the rise time of the DC power supply. A diode 22 is connected between the junction of resistor 21 and capacitor 23 and the junction of LED 19a and resistor 24 to prevent the LED 19a from being conducted due to a charging current of capacitor 23.

The following relations exist between resistors 21, 24 and 25:

$$R_3 << R_1 << R_2$$

where $R_1$, $R_2$ and $R_3$ are the resistance values of resistors 21, 24 and 25, respectively.

The anode-cathode path of photo-thyristor 19b is connected in parallel with the series circuit of Zener diode 15 and LED 13a of the photocoupler circuit 27. A latching circuit if formed by parallel connection of a capacitor 17 and a resistor 18, the latching circuit being connected across the cathode and gate electrode of photo-thyristor 19b in order to keep it on after the voltage across its anode and cathode terminals is substantially reduced to zero.

When the power switch 11 of the computer is turned on, DC voltage is applied across the LED 13a of photocoupler 13 to emit light to phototransistor 13b, and so the latter is caused to conduct and AC-DC converter 10 is energized, producing a DC voltage Vo across the output terminals 30a and 30b. This DC output voltage is divided by resistors 21 and 24 and the voltage developed across resistor 21 is impressed upon the series circuit of Zener diode 20 and LED 19a. Since $R_1$ is much smaller than $R_2$, the voltage developed across resistor 21 is much lower than that developed across resistor 24 and is not sufficient to bias Zener diode 20 into conduction, and hence, no current flows through the LED 19a of photo-thyristor 19 during the time the AC-DC converter 10 is delivering appropriate DC output voltage.

When shutting down the computer, the CPU 30 applies a shutdown command signal to the transistor 26 to cause it to turn on at appropriate timing. Since $R_3$ is much smaller than $R_1$, the voltage impressed across the Zener diode 20 rises above its breakdown voltage, causing it to turn on to conduct a current through the LED 19a. By optical coupling with LED 19a, the photo-thyristor 19b is rendered conductive, establishing a short-circuit path in parallel with the Zener diode 15 and LED 13a. Thus, LED 13a and hence phototransistor 13b are turned off, shutting down the AC-DC converter 10. As a result, LED 19a is turned off, but photo-thyristor 19b keeps conducting due to the latching action of capacitor 17 and resistor 18. LED 13a is therefore held under turn-off state, and hence, phototransistor 13b keeps nonconducting.

The AC input power source can now be safely turned off the computer by the switch 11. When this occurs, the DC output voltage of rectifier 12 is reduced to zero and the photo-thyristor 19b is reset to nonconducting state.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A direct-current power supply comprising:
   AC-DC converter means for converting alternating-current power from an external AC power source to direct-current power;
   rectifier means for converting alternating-current power from the external source to direct-current voltage;
   a first light-emitting diode connected to the rectifier means for emitting light in response to a direct-current voltage therefrom;
   a phototransistor optically coupled with the first light-emitting diode and connected in the AC-DC converter means for activating same in response to the light from the first light-emitting diode;
   a second light-emitting diode;
   a photo-thyristor connected to said rectifier means and optically coupled with the second light-emitting diode for establishing a low-impedance path across the first light-emitting diode in response to light from the second light-emitting diode;
   switching means connected to output terminals of the AC-DC converter means and responsive to a shutdown command signal applied thereto for activating the second light-emitting diode to cause light to be emitted therefrom to the photo-thyristor; and
   latching means connected between the rectifier means and a gate electrode of the photo-thyristor.

2. A direct-current power supply as claimed in claim 1, wherein the switching means comprises:
   a first series circuit including a first resistor and a capacitor connected across the output terminals of the AC-DC converter means;
   a second resistor forming a second series circuit with the second lightemitting diode, the second series circuit being connected in parallel with the first series circuit;
   a diode connected to allow current to from from a first junction of the first resistor and the capacitor to a second junction of the second lightemitting diode and the second resistor; and
   a third series circuit including a third resistor and a transistor, the transistor being responsive to the shutdown command signal for connecting the third resistor in parallel with the second resistor, the first resistor having a value much smaller than the second resistor and much greater than the third resistor.

3. A direct-current power supply as claimed in claim 2, wherein the second series circuit further includes a breakdown diode.

* * * * *